(12) United States Patent
Hoshino et al.

(10) Patent No.: US 8,203,240 B2
(45) Date of Patent: Jun. 19, 2012

(54) LIQUID COOLED ROTATING ELECTRICAL MACHINE

(75) Inventors: Katsuhiro Hoshino, Hitachinaka (JP);
Kenichi Nakayama, Hitachinaka (JP);
Nobuyuki Kajiya, Hitachinaka (JP);
Takayuki Koizumi, Hitachinaka (JP);
Toshiaki Ueda, Naka (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 12/333,807

(22) Filed: Dec. 12, 2008

(65) Prior Publication Data
US 2009/0184591 A1    Jul. 23, 2009

(30) Foreign Application Priority Data

Dec. 14, 2007    (JP) ................................ 2007-323637

(51) Int. Cl.
*H02K 3/34* (2006.01)
*H02K 3/32* (2006.01)
*H02K 9/19* (2006.01)
(52) U.S. Cl. ............. 310/54; 310/65; 310/214; 310/215
(58) Field of Classification Search .................... 310/54, 310/65, 214, 215; *H02K 9/19, 3/24, 3/34, H02K 9/00, 3/00, 3/32*
See application file for complete search history.

(56) References Cited

U.S. PATENT DOCUMENTS

| 6,870,292 B2 * | 3/2005 | Owada et al. ................. 310/194 |
| 2002/0057031 A1 * | 5/2002 | Ueda et al. .................... 310/208 |
| 2006/0022549 A1 | 2/2006 | Otsuji |
| 2006/0022550 A1 | 2/2006 | Otsuji |
| 2007/0278869 A1 * | 12/2007 | Taketsuna ........................ 310/54 |
| 2008/0265701 A1 | 10/2008 | Ueda et al. |

FOREIGN PATENT DOCUMENTS

| JP | 2005-057884 A |   | 3/2005 |
| JP | 2005057884 A | * | 3/2005 |
| JP | 2006-67778 A |   | 3/2006 |
| JP | 2006-197772 A |   | 7/2006 |

OTHER PUBLICATIONS

Machine translation of Nakajima, JP2005-057884.*

* cited by examiner

*Primary Examiner* — Quyen Leung
*Assistant Examiner* — Michael Andrews
(74) *Attorney, Agent, or Firm* — Crowell & Moring LLP

(57) ABSTRACT

A rotating electrical machine includes: a stator that including a stator core and a teeth section, with a stator coil wound at the teeth section; a rotor arranged via a clearance at an inner periphery side of the stator and supported in a freely rotating manner; and a distribution unit supported by a resin holder, and including a conductor connected to the stator coil. The rotating electrical machine is cooled by coolant. The stator coil includes a coil end section projecting from an end of the stator in an axial direction. A gap is formed between an end of the stator core and a lower surface of the distribution unit by mounting the distribution unit on an upper part of the coil end section. The gap constitutes a path for the coolant.

1 Claim, 13 Drawing Sheets

LIQUID COOLED ROTATING ELECTRICAL MACHINE

INCORPORATION BY REFERENCE

The disclosure of the following priority application is herein incorporated by reference:

Japanese Patent Application No. 2007-323637 filed Dec. 14, 2007.

BACKGROUND OF THE INVENTION

1. Field of the Invention

The present invention relates to a rotating electrical machine, and particularly relates to a liquid-cooled rotating electrical machine.

2. Description of Related Art

At a front wheel, rear wheel, or four-wheel drive vehicle that is mainly powered by a rotating electrical machine only or an engine and a rotating electrical machine, the rotating electrical machine is fitted between the engine and a transmission or is fitted within the transmission and the rotating electrical machine is mechanically connected to the engine and the transmission. Rises in temperature are problematic because the rotating electrical machine is a compact, high-output rotating electrical machine. It is therefore necessary to rapidly dissipate heat generated at the stator core and coils of the rotating electrical machine used as the main power of the vehicle.

The rotating electrical machine used as the main power of the vehicle is cooled by a dedicated coolant for dissipating heat. Alternatively, the coolant can also function as lubricating oil for a transmission or decelerator when the rotating electrical machine is built into a transmission or decelerator. This both increases the cooling performance of the rotating electrical machine and brings about a compact, high output rotating electrical machine.

The rotating electrical machine used as the main power for the vehicle is required to both be compact and have a high output. This means that the use of a centralized or concentrated winding type stator structure is common. When a centralized winding type stator structure is adopted, a stator side armature includes an annular stator core, a bobbin that is an insulator that covers a teeth section of the stator core, and a coil formed by winding a conductor around the bobbin. The bobbin is an important part that both provides insulation between the coil and the core and acts as a shape supporting member for the coil. Resin molded articles are typically used as the bobbin. The thermal conductivity of such resin molded articles is extremely low compared to metal components such as the stator coil and core.

Technology is disclosed as a method of cooling a rotating electrical machine where circular plates that force the coolant to flow at both coil ends of the rotating electrical machine are provided so that the coolant is moved to trace each coil. This increases the heat dissipating effect. Such technology is disclosed in Japanese Laid-open Patent Publication No. 2006-197772 (patent document 1).

Technology is also disclosed where a cooling groove is provided at a portion of the bobbin the coil is wrapped around. Cooling then takes place from the inside of the coil. Such technology is disclosed in Japanese Laid-open Patent Publication No. 2005-57884 (patent document 2).

Technology for insulating between the coil and the stator core and supporting the coil shape is also disclosed where an engaging member (projecting section positioned between conducting wires) is provided on the cylindrical section of the bobbin that the coil wires (conducting wires) are wound around so as to restrict the position of winding of coil wires. The coil wires are then wound around this engaging member. This means that a gap created between the coil wires and collapsing of the coil wires upon completion of winding are prevented. The coil wire for the first layer can therefore be wound in an orderly manner. Such technology is disclosed in Japanese Laid-open Patent Publication No. 2006-67778 (patent document 3).

Unfortunately, in patent document 1, the path taken by the coolant is such that the coolant only makes direct contact with surfaces of the coil ends. This means that a portion on the inside of the coil end that makes contact with the stator core that can be considered to be the portion of a centralized winding type stator that heats up the most is not cooled.

In patent document 2, it is necessary for the coil and the stator core to face each other via the cooling groove in order to form the cooling groove in the bobbin. This creates problems with regards to insulation.

With the bobbin disclosed in patent document 3, bobbin brims are provided to the outer diameter side and the inner diameter side of the coil in order to prevent the coil winding from collapsing. However, this degrades cooling efficiency because the surface area of the coil the coolant flows when a motor is cooled directly by the coolant collides with is reduced by the brims.

It is therefore an object of the present invention to provide a rotating electrical machine with improved cooling performance that is capable of maintaining insulation.

SUMMARY OF THE INVENTION

A rotating electrical machine according to a first aspect of the present invention includes: a stator that comprises a stator core and a teeth section, with a stator coil wound at the teeth section; a rotor arranged via a clearance at an inner periphery side of the stator and supported in a freely rotating manner; and a distribution unit supported by a resin holder, and comprising a conductor connected to the stator coil, wherein: the rotating electrical machine is cooled by coolant; the stator coil comprises a coil end section projecting from an end of the stator in an axial direction; a gap is formed between an end of the stator core and a lower surface of the distribution unit by mounting the distribution unit on an upper part of the coil end section, and the gap constitutes a path for the coolant.

According to a second aspect of the present invention, in the rotating electrical machine according to the first aspect, it is preferable to further include: a bobbin, arranged between the teeth section and the stator core of the stator, that provides insulation between the teeth section and the stator coil and supports the stator coil; and a hole, provided at least one of a flange section on an outer diameter side of the bobbin and a flange section on an inner diameter side of the bobbin, that enables the coolant to make contact with an outer periphery of the stator coil.

According to a third aspect of the present invention, in the rotating electrical machine according to the second aspect, the hole may be provided at both the flange section on the outer diameter side of the bobbin and the flange section on the inner diameter side of the bobbin; and a groove may be provided at a position on a body of the bobbin facing an inner periphery side of the coil end section so as to enable the coolant to make contact with the inner periphery side of the coil end section of the stator coil.

DESCRIPTION OF PREFERRED EMBODIMENTS

A description is now given of a configuration for a rotating electrical machine of an embodiment of the present invention using FIGS. 1 to 9.

First, a description is given of an overall configuration for a rotating electrical machine apparatus including the rotating electrical machine of this embodiment.

Figure 1:
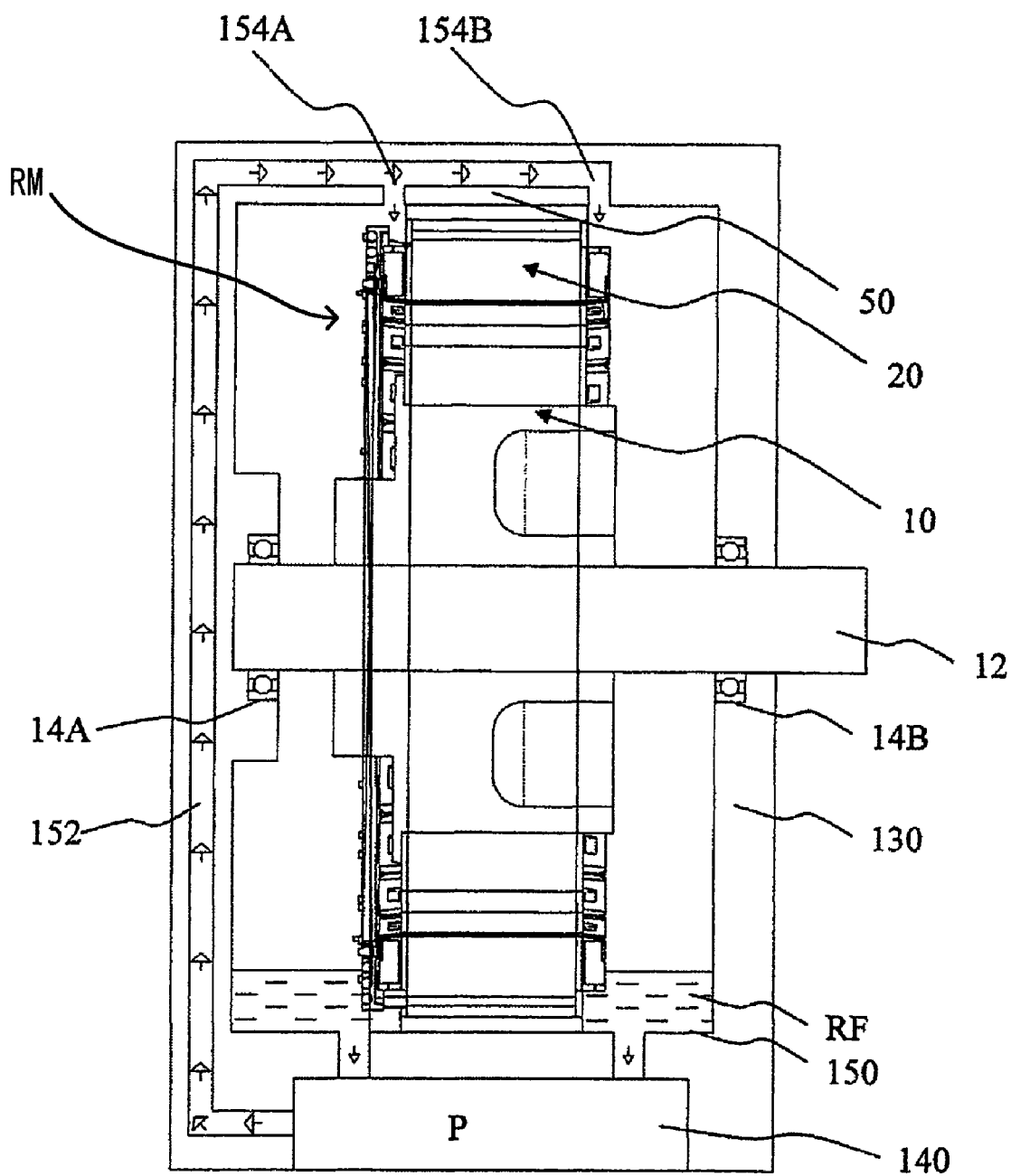
FIG. 1 is a cross-sectional view showing an overall configuration for a rotating electrical machine apparatus including a rotating electrical machine of an embodiment of the present invention.

FIG. 1 is a cross-sectional view showing an overall configuration for the rotating electrical machine apparatus including the rotating electrical machine of the first embodiment of the present invention.

A rotating electrical machine RM used to describe this embodiment is for use with a hybrid vehicle. The rotating electrical machine RM is mounted between an engine ENG (refer to FIG. 10) and a transmission TM or is mounted within the transmission TM. It is necessary for the rotating electrical machine RM to be compact and have high output. This means that temperature rises are problematic and that it is necessary to rapidly dissipate heat generated by the stator core and coil of the rotating electrical machine RM used as the main power of the vehicle.

The periphery of the rotating electrical machine RM is encompassed by a case 130. When the rotating electrical machine RM is arranged between the engine ENG and the transmission TM, the case 130 can include a case for the engine ENG and a case for the transmission TM. When the rotating electrical machine RM is mounted within the transmission TM, the case 130 can include the case of the transmission TM.

The rotating electrical machine RM is a three-phase synchronous motor with a built-in permanent magnet. The rotating electrical machine RM operates as an electric motor when a large (for example, 400 A) three-phase alternating current is supplied to the stator coil. The rotating electrical machine RM also operates as a generator when driven by an engine and outputs a three-phase alternating generated output. When the rotating electrical machine RM operates as a generator, the current outputted by the stator coil is a current that is small compared to when operating as an electric motor and is, for example, 100 A. The rotating electrical machine RM used in this embodiment is a flat type rotating electrical machine with a thickness in a rotating axis direction smaller than an external diameter.

The rotating electrical machine RM includes a rotor 10, a stator 20, and a housing 50. The rotor 10 is arranged on the inside of the stator 20 via an intervening gap. The rotor 10 is fixed to a shaft 12. The ends of the shaft 12 are rotatably supported by bearings 14A, 14B. The outer periphery of the stator 20 is fixed to the inner periphery of the housing 50. The outer periphery of the housing 50 is fixed to the inside of the case 130.

A pump 140 is located at the bottom of the case 130. A sump 150 for coolant RF is formed at the bottom of the case 130. Insulating oil, for example, is used as the coolant RF. Part of the lower end of the stator 20 is soaked in the coolant RF that collects in the sump 150. The pump 140 sucks in coolant RF that collects in the sump 150 and discharges the coolant RF from coolant outlets 154A, 154B formed at an upper part of the case 130 via a coolant path 152. The coolant outlets 154A, 154B are formed at upper parts of both ends (coil ends) of the stator coil wrapped around the teeth of the stator 20. The coolant outlets 154A are provided at thirteen locations. The coolant outlets 154B are also provided at thirteen locations.

The coolant discharged from the coolant outlets 154A, 154B is directly sprayed onto both coil ends of the stator coil so that the coil ends of the stator coil are cooled. The coolant RF that relieves the heat of the stator 20 collects in the bottom of the case 130. The coolant RF is then forcibly circulated through the coolant path 152 by the pump 140. The coolant RF is then again discharged from the coolant outlets 154A, 154B so as to cool the stator 20.

Figure 2:
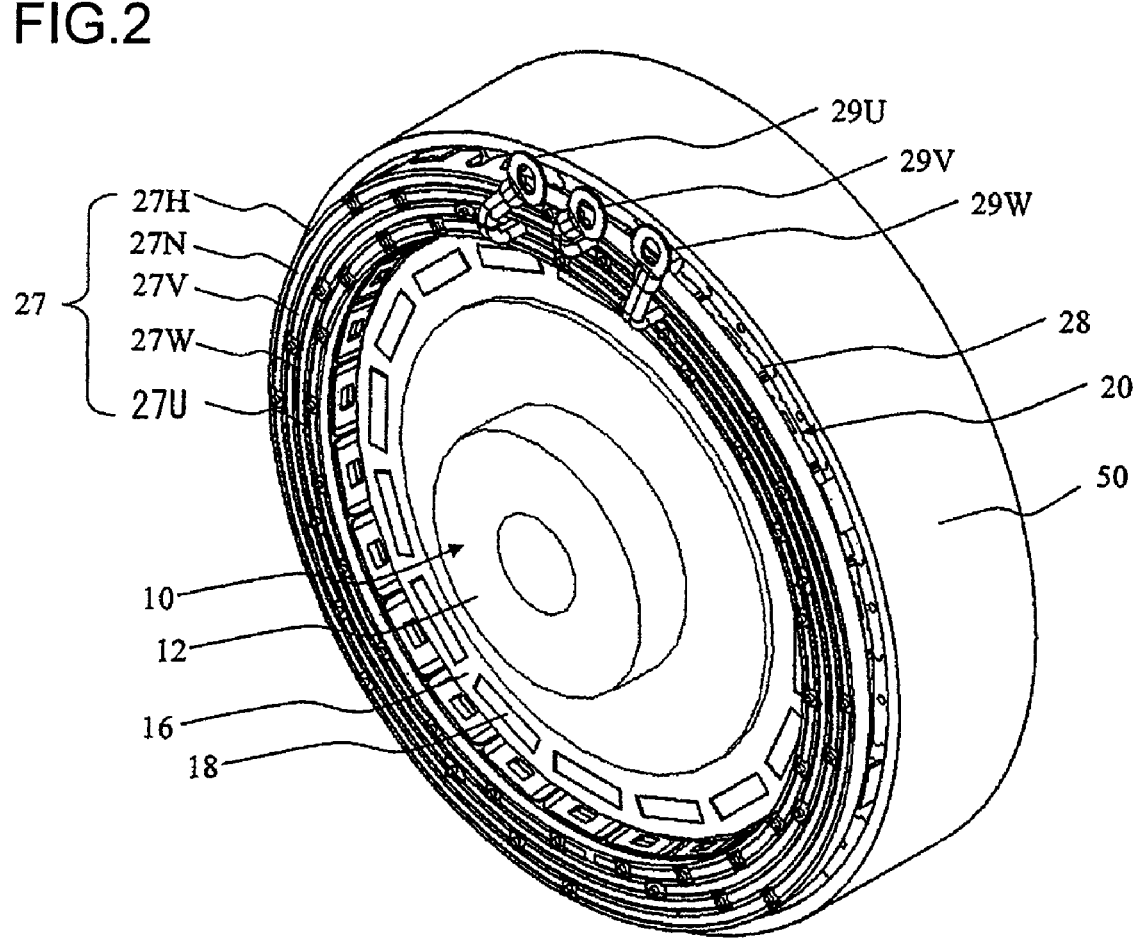
FIG. 2 is a perspective view showing a configuration for a rotating electrical machine of the embodiment of the present invention.
Figure 3:
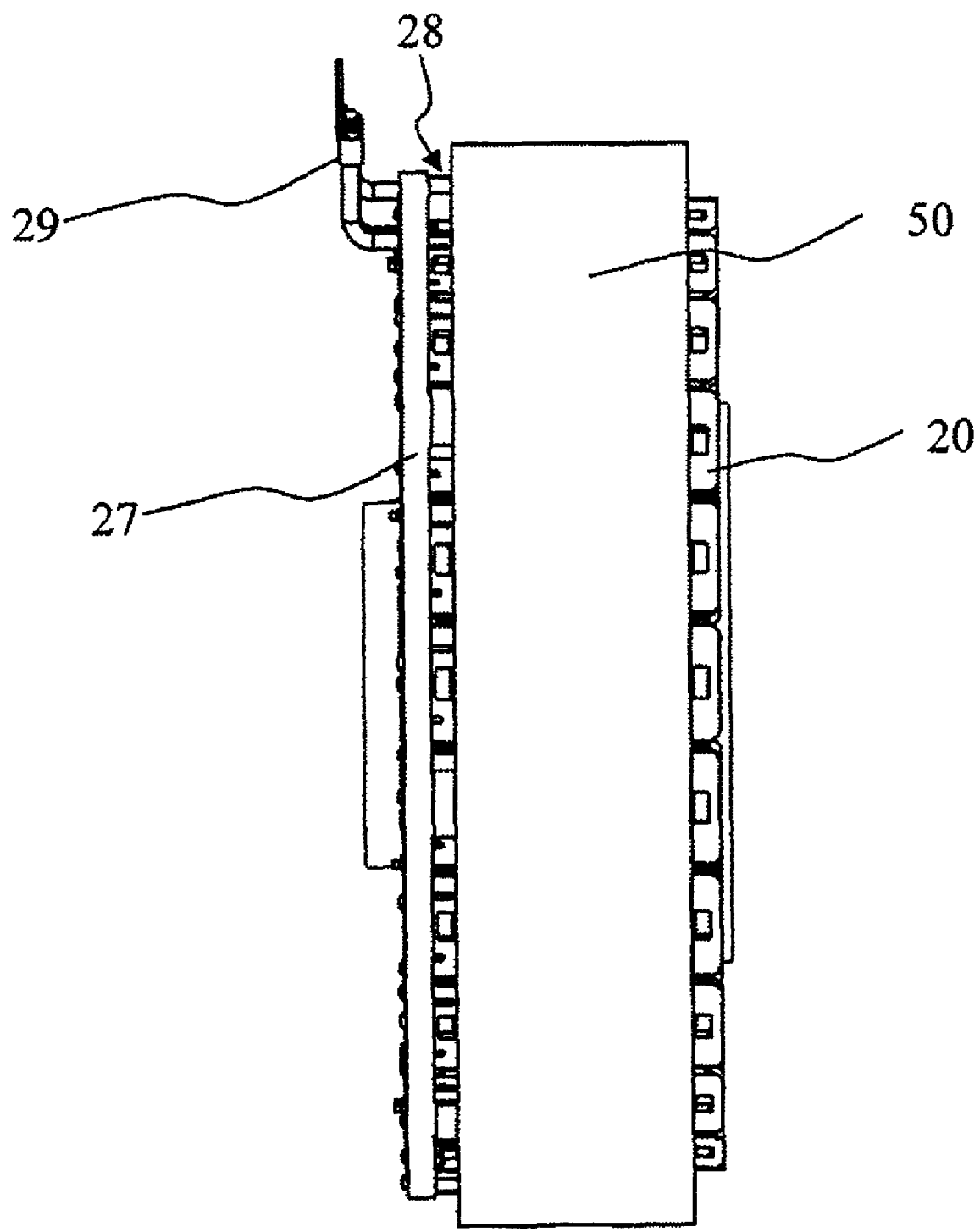
FIG. 3 is a front view showing a configuration for the rotating electrical machine of the embodiment of the present invention.

Next, a description is given of a configuration for the rotating electrical machine of this embodiment using FIGS. 2 and 3.

FIG. 2 is a perspective view showing a configuration for the rotating electrical machine of the embodiment of the present invention. FIG. 3 is a front view showing a configuration for the rotating electrical machine of the embodiment of the present invention. In FIGS. 2 and 3, numerals that are the same as for FIG. 1 indicate the same portions.

As shown in FIG. 2, the rotating electrical machine RM includes the rotor 10, the stator 20, and the housing 50.

The rotor 10 includes a rotor core 16, and permanent magnets 18 inserted into holes formed in the rotor core 16. The permanent magnets 18 are in the shape of rectangular parallelepipeds. In this example, 16 permanent magnets 18 are provided. This means that the rotor 10 is provided with 16 poles. One permanent magnet 18 per one pole can be used or the permanent magnets 18 can be split between a number of poles.

A U-phase stator coil, a V-phase stator coil, and a W-phase stator coil are centrally wound at the stator teeth core of the stator 20 in a concentrated manner. A plurality of stator coil is provided for each phase. For example, in this example, eight stator coils are provided for each phase.

Power supply connecting terminals 29U, 29V, 29W are terminals that supply electrical power to stator coils for each phase. The power supply connecting terminals 29U, 29V, 29W are connected to a power convertor. Three-phase alternating current converted by the power converter is supplied to the power supply connecting terminals 29U, 29V, 29W. Three-phase alternating current outputted by the power supply connecting terminals 29U, 29V, 29W is supplied to the power converter and converted to direct current.

A distribution unit 27 for supplying power from the power supply connecting terminals 29U, 29V, 29W to each of the stator coils are provided between the power supply connecting terminals 29U, 29V, 29W and each stator coil.

The distribution unit 27 includes a U-phase connecting ring 27U, a V-phase connecting ring 27V, a W-phase connecting ring 27W, a neutral point connecting ring 27N, and a holder 27H. The U-phase connecting ring 27U, the V-phase connecting ring 27V, the W-phase connecting ring 27W, and the neutral point connecting ring 27N can be made by punching a copper plate out into a circular arc, or using conductive wiring coated with an insulating film. The holder 27H is ring-shaped and is made of resin. Grooves for inserting the U-phase connecting ring 27U, the V-phase connecting ring 27V, the W-phase connecting ring 27W, and the neutral point connecting ring 27N are formed in advance at the holder 27H. The U-phase connecting ring 27U, the V-phase connecting ring 27V, the W-phase connecting ring 27W, and the neutral point connecting ring 27N are then inserted into the grooves of the holder 27H so as to be supported.

One end of each of eight U-phase stator coils is connected to the U-phase connecting ring 27U. One end of each of eight V-phase stator coils is connected to the V-phase connecting ring 27V. One end of each of eight W-phase stator coils is connected to the W-phase connecting ring 27W. The other ends of the eight U-phase stator coils, the other ends of the eight V-phase stator coils, and the other ends of the eight W-phase stator coils are connected to the neutral point connecting ring 27N.

The power supply connecting terminal 29U is connected to the U-phase connecting ring 27U. The power supply connecting terminal 29V is connected to the V-phase connecting ring 27V. The power supply connecting terminal 29W is connected to the W-phase connecting ring 27W.

Electrical power inputted to the power supply connecting terminals 29U, 29V, 29W is supplied to the stator coil by the distribution unit 27. The rotating electrical machine RM is mounted between the engine ENG and the transmission TM or is mounted within the transmission TM. It is necessary for the rotating electrical machine RM to be compact and have high output. This means that temperature rises are problematic and that it is necessary to rapidly dissipate heat generated by the stator core and coil of the rotating electrical machine RM used as the main power of the vehicle.

As shown in FIG. 3, the distribution unit 27 is arranged mounted on a coil end of the centrally wound U-phase, V-phase, and W-phase stator coils at the stator teeth core of the stator 20. The coil end of each phase stator coil projects from a side surface of the housing 50. A gap 28 is therefore formed between the distribution unit 27 and the housing 50.

The coolant RF discharged from the coolant outlets 154A shown in FIG. 1 is directly sprayed onto one of the coil ends of the stator coil through the gap 28. It is therefore possible to cool the coil end of the stator coil from the outer periphery side using the coolant RF and high output running is therefore possible. The gap 28 is a path that enables the coolant RF to flow to the outer periphery of the coil end of the stator coil. The distribution unit is not provided at the other end of the housing 50 shown in the drawings. The coolant RF discharged from the coolant outlet 154B shown in FIG. 1 is then directly sprayed onto the other coil end of the stator coil so as to cool the coil end of the stator coil.

Figure 4:
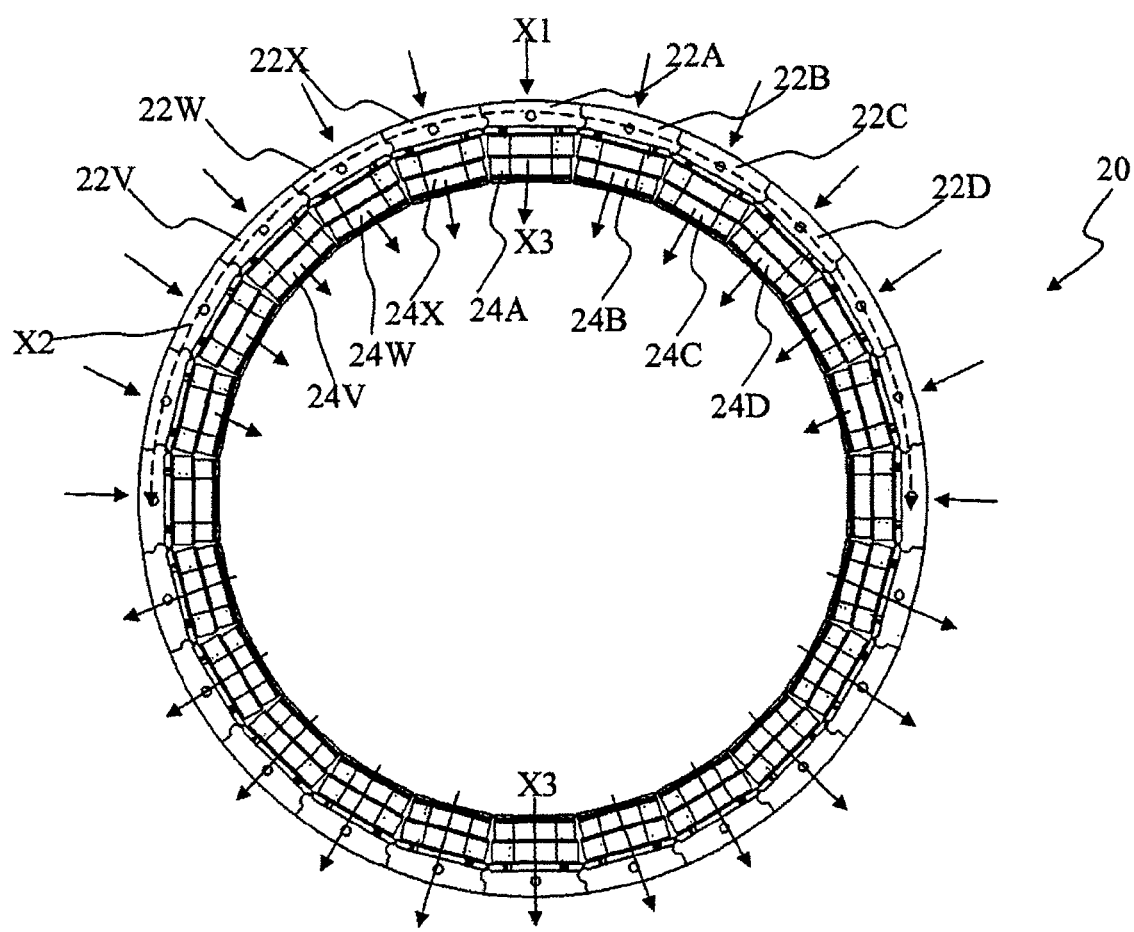
FIG. 4 is a side view showing a configuration for a stator used in the rotating electrical machine of the embodiment of the present invention.
Figure 5:
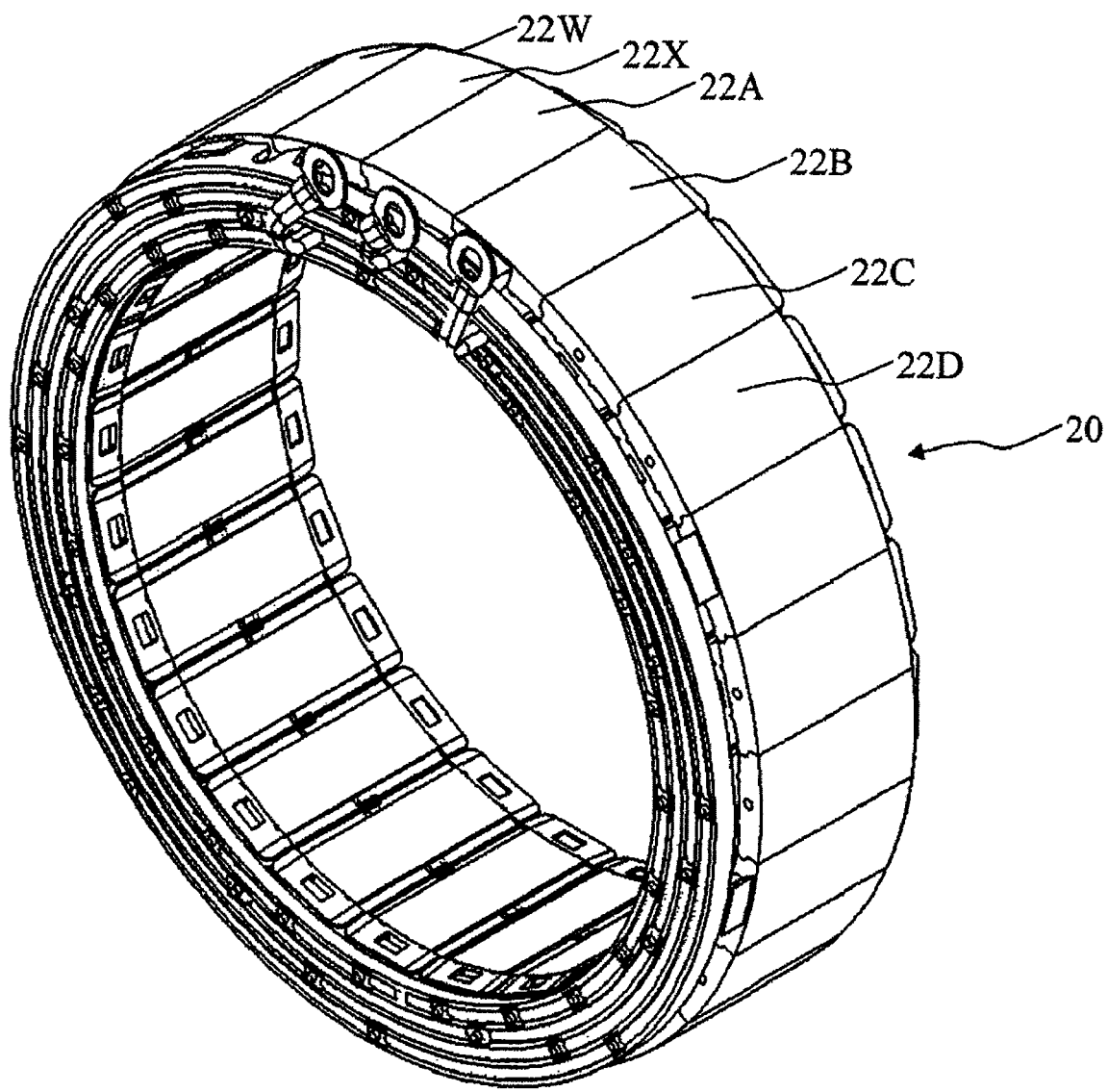
FIG. 5 is a perspective view showing a further configuration for the stator used in the rotating electrical machine of the embodiment of the present invention.

Next, a description is given of a configuration for the stator 20 used by the rotating electrical machine of this embodiment using FIGS. 4 and 5.

FIG. 4 is a side view showing a configuration for the stator 20 of the rotating electrical machine of the embodiment of the present invention. FIG. 4 shows a situation where the distribution unit 27 shown in FIG. 2 is removed. FIG. 5 is a perspective view showing a further configuration for the stator 20 used in the rotating electrical machine of the embodiment of the present invention. In FIGS. 4 and 5, numerals that are the same as for FIGS. 1 to 3 indicate the same portions.

A stator core typically includes an annular ring, and a teeth section protruding in an inner diameter direction from the ring. In the embodiment shown in FIGS. 4 and 5, the stator core is formed by integrating the ring and the teeth section and is constituted by a plurality of stator cores equal to the number of teeth of the teeth section provided in a circumferential direction. The stator core therefore includes twenty-four stator teeth cores 22A, 22B, 22C, . . . , 22V, 22W, and 22X. Each stator teeth core is formed by laminating flat rolled magnetic steel sheets in the axial direction of the rotating electrical machine.

For example, a single stator teeth core 22A includes an arc section and a teeth section projecting from the center of the arc section so as to form a T-shape when viewed from the side. A ring is then formed by connecting twenty-four neighboring arc sections.

Stator coils 24A, 24B, 24C, . . . , 24V, 24W, 24X are wound in a centralized or concentrated manner at each of the stator teeth cores 22A, 22B, 22C, . . . , 22V, 22W, 22X, respectively.

As described in FIG. 1, the coolant RF is expelled from the coolant outlets 154A at thirteen locations in the direction of the arrow X1 from an outer diameter direction of the stator 20 and is sprayed onto the coil end of the stator coil positioned at the upper half within the stator coils 24A, 24B, 24C, . . . , 24V, 24W, 24X. The gap 28 described in FIG. 3 acts as a path for the coolant RF. Some of the sprayed coolant RF therefore flows in the direction of the arrow X2 along the outer periphery of the coil end before finally dripping downwards.

A remaining portion of the sprayed coolant RF flows in the direction of the arrow X3, i.e. flows at the inside of the coil end so as to flow to the inside of the stator 20. The configuration for achieving this is described hereafter using FIG. 8.

Figure 6:
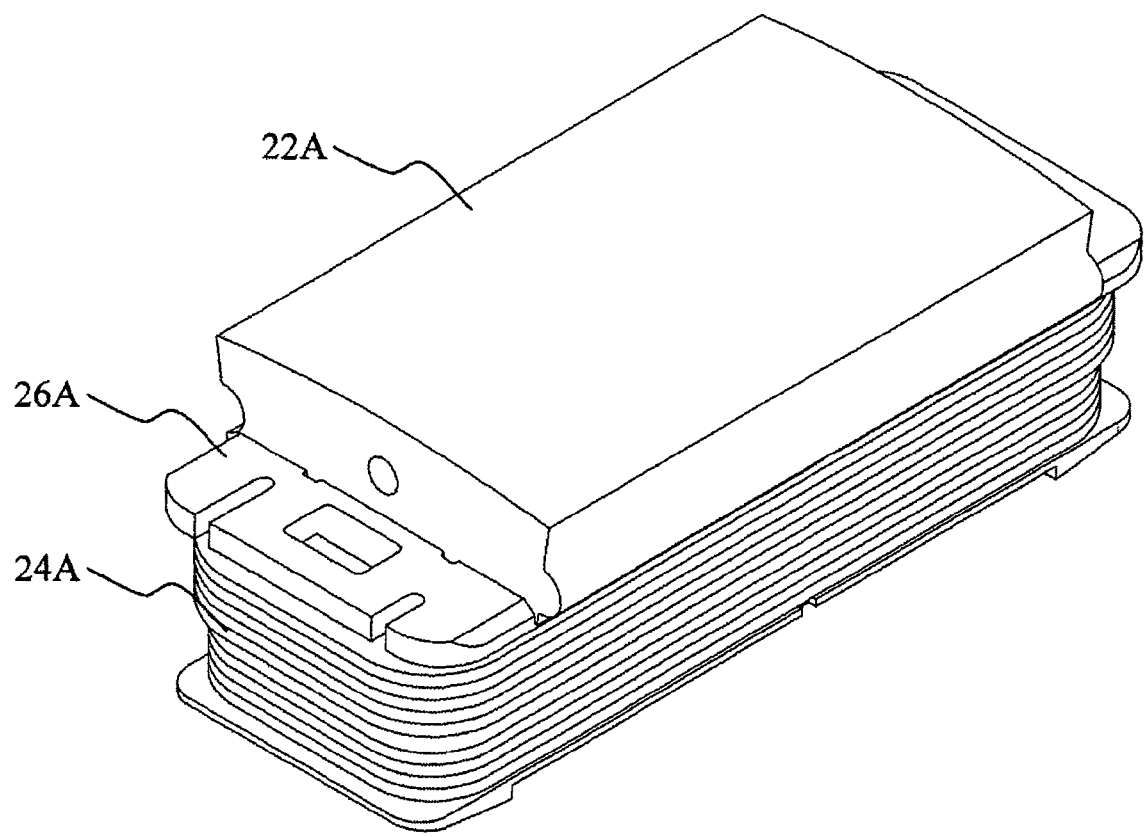
FIG. 6 is a perspective view showing the essential parts of a configuration for the stator used in the rotating electrical machine of the embodiment of the present invention.

Next, a description is now given of a configuration for the essential parts of the stator 20 for the rotating electrical machine of this embodiment using FIG. 6.

FIG. 6 is a perspective view showing the essential parts of a configuration for the stator 20 used in the rotating electrical machine of the embodiment of the present invention. In FIG. 6, numerals that are the same as for FIGS. 1 to 5 indicate the same portions.

FIG. 6 shows a situation where a stator coil 24A is wound at the single stator teeth core 22A shown in FIG. 4. The relationship is the same for other stator teeth cores 22B, 22C, ..., 22V, 22W, 22X and stator coils 24B, 24C, ..., 24V, 24W, 24X, respectively.

A resin bobbin 26A is installed at the stator teeth core 22A. A stator coil 24A is then wound on the bobbin 26A. The bobbin 26A is provided to provide insulation between the stator teeth core 22A and the stator coil 24A.

Figure 7:
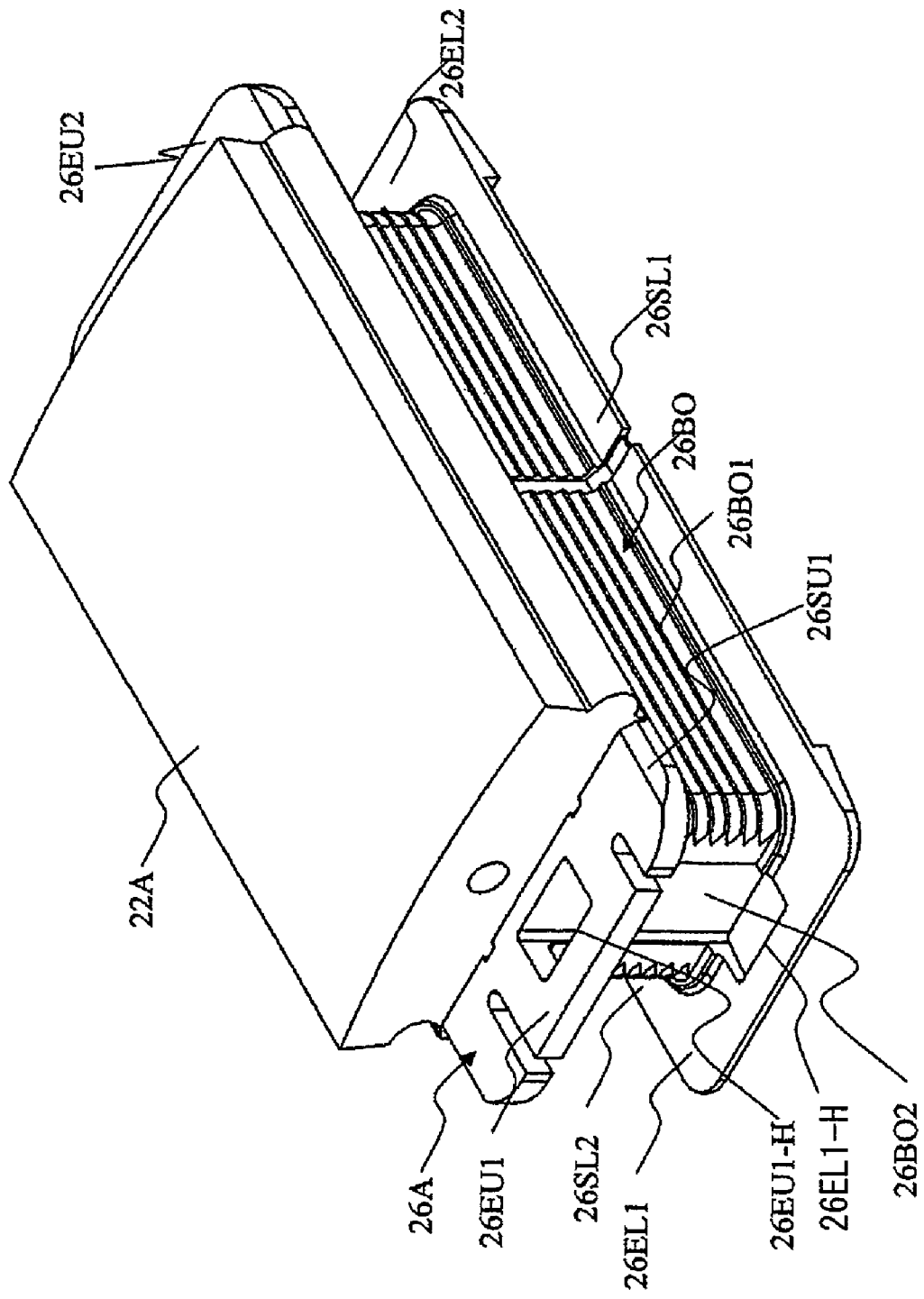
FIG. 7 is a perspective view showing a configuration for a bobbin used in the stator used in the rotating electrical machine of the embodiment of the present invention.

Next, a description is given of the shape of the bobbin used in the stator 20 for use with the rotating electrical machine of this embodiment using FIG. 7.

FIG. 7 is a perspective view showing a configuration for a bobbin used in the stator 20 used in the rotating electrical machine of the embodiment of the present invention. In FIG. 7, numerals that are the same as for FIGS. 1 to 6 indicate the same portions.

The bobbin 26A is installed at a teeth section of the stator teeth core 22A.

The bobbin 26A includes a bobbin body 26BO, and flange sections 26EU1, 26EL1, 26EU2, 26EL2, 26SU1, and 26SL1, formed integrally using resin.

The bobbin body 26BO is substantially in the shape of a rectangular parallelepiped with a hole passing through it. The teeth section of the stator teeth core 22A is then inserted through the hole. The flange section 26EU1 is provided at the outer diameter side of the bobbin body 26BO and at a side towards one of the coil ends. The flange section 26EU2 is provided at the outer diameter side of the bobbin body 26BO and at a side towards the other coil end. The flange section 26SU1 is provided at the outer diameter side of the bobbin body 26BO at one side of the stator teeth core 22A. Although not shown in the drawings, a further flange section is also provided at the other side of the stator teeth core 22A. The flange section 26EL1 is provided to the side of the lower end of the bobbin body 26BO and at the side towards one of the coil ends. The flange section 26EL2 is provided to the side of the lower end of the bobbin body 26BO and at the side towards the other coil end. The flange section 26SL1 is provided to the lower end side of the bobbin body 26BO at one side of the stator teeth core 22A. Although not shown in the drawings, a further flange section is also provided at the other side of the stator teeth core 22A.

The flanges 26EU1, 26EL1, 26EU2, 26EL2, 26SU1, and 26SL1 are highly insulating in order to prevent the stator coil from coming into contact with the stator teeth core 22A when the stator coil is wrapped around the bobbin body 26BO.

A groove 26BO1 extending in the winding direction of the stator coil is formed at the outer periphery of the bobbin body 26BO. The groove 26BO1 acts as a guide groove during winding of the stator coil onto the bobbin body 26BO and prevents the position of the stator coil from shifting.

A hole 26EU1-H is formed in the flange section 26EU1. A hole 26EL1-H is also formed in the flange 26EL1. A groove 26BO2 is also formed at the side of the bobbin body 26BO towards the coil end section. The bottom surface of the groove 26BO2 is positioned further towards the inner periphery side of the bobbin body 26BO than the surface where the groove 26BO1 of the bobbin body 26BO is formed. A gap is therefore formed between the inner periphery side coil end and the bobbin body 26BO by the groove 26BO2 when the stator coil is wrapped around the bobbin body 26BO. This gap forms a path for the coolant to flow through.

Although not shown in the drawings, holes are similarly formed in the flange sections 26EU2, 26EL2. Grooves are also formed as with the groove 26BO2 at positions corresponding to the holes of the flange sections EU2, EL2 of the bobbin body 26BO.

It is therefore possible to improve insulation between the stator teeth core 22A and the stator coil by interposing the bobbin body 26BO between the stator teeth core 22A and the stator coil.

Figure 8:
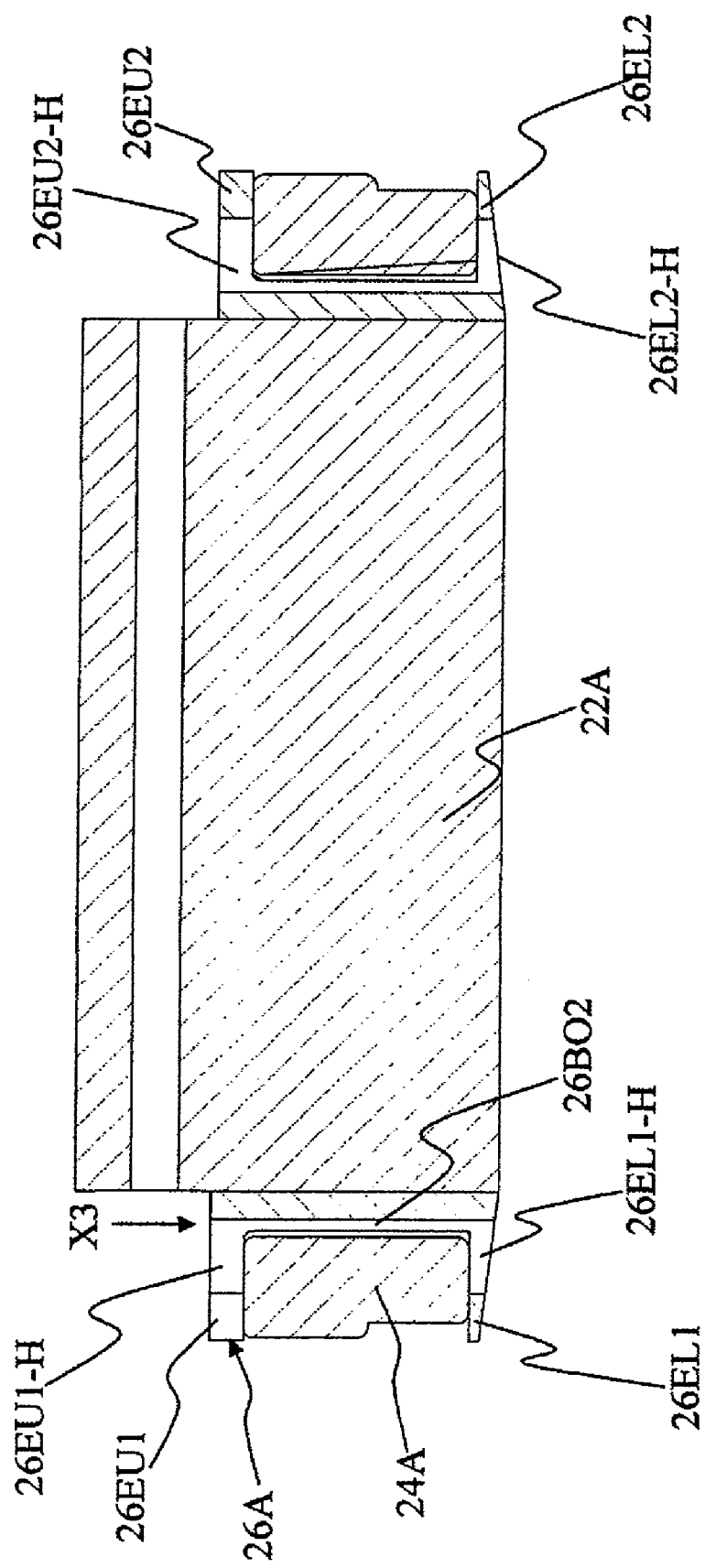
FIG. 8 is a cross-sectional view showing a state where a stator coil is wrapped around a stator teeth core in the rotating electrical machine of the embodiment of the present invention.

Next, a description is given of a situation where the stator coil is wound onto the stator teeth core 22A for the rotating electrical machine of this embodiment using FIG. 8.

FIG. 8 is a cross-sectional view showing a state where the stator coil is wrapped around the stator teeth core 22A in the rotating electrical machine of the embodiment of the present invention. In FIG. 8, numerals that are the same as for FIGS. 1 to 7 indicate the same portions.

The teeth section of the stator teeth core 22A is then inserted at the inner periphery side of the bobbin body 26BO. The stator coil 24A is then wound around the outer periphery of the bobbin body 26BO.

When the rotating electrical machine RM is running, heat generated by the stator teeth core 22A due to iron loss and heat generated by a coil 23 due to copper loss is problematic. The contact surface area of the coolant RF with the surface of the stator teeth core 22A is increased as a result of the flow of coolant RF through the gap 28 between the stator teeth core 22A and the distribution unit 27. However, the bobbin 26A supporting the stator coil 24A is an obstruction and an increase in the surface area where the coolant RF and the stator coil 24A make contact is not anticipated.

As described in FIG. 7, it is possible to increase the surface area where the coolant RF makes contact with the stator coil 24A by providing the hole 26EU-H at the flange section towards the outer diameter side of the stator of the bobbin 26A. As described in FIG. 7, it is also possible to increase the surface area where the coolant RF makes contact with the stator coil 24A by providing the hole 26EL-H at the flange section on the inner diameter side of the stator of the bobbin 26A.

The holes 26EU-H, 26EL-H of the flange sections are provided at two locations, that is, on the outer diameter side and the inner diameter side of the flange sections. However, it is also possible to provide the hole on just one side as this will also increase the surface area where the coolant makes contact with the coil. The surface area where the coolant makes contact with the coil is of course doubled by providing the holes on both sides.

The groove 26BO2 is also formed on a coil end side of the bobbin body 26BO as shown in FIG. 7. A gap is then formed between the inner periphery of the coil end and the bobbin body 26BO by the groove 26BO2 when the stator coil 24A is wound at the bobbin body 26BO.

It is possible for coolant that flows in from the hole 26EU1-H of the flange section 26EU1 to pass through the gap formed by the groove 26BO2 and flow out from the hole 26EL1-H of the flange section 26EL1. It is therefore possible for the inner periphery side coil end to be cooled by the coolant.

Figure 9:
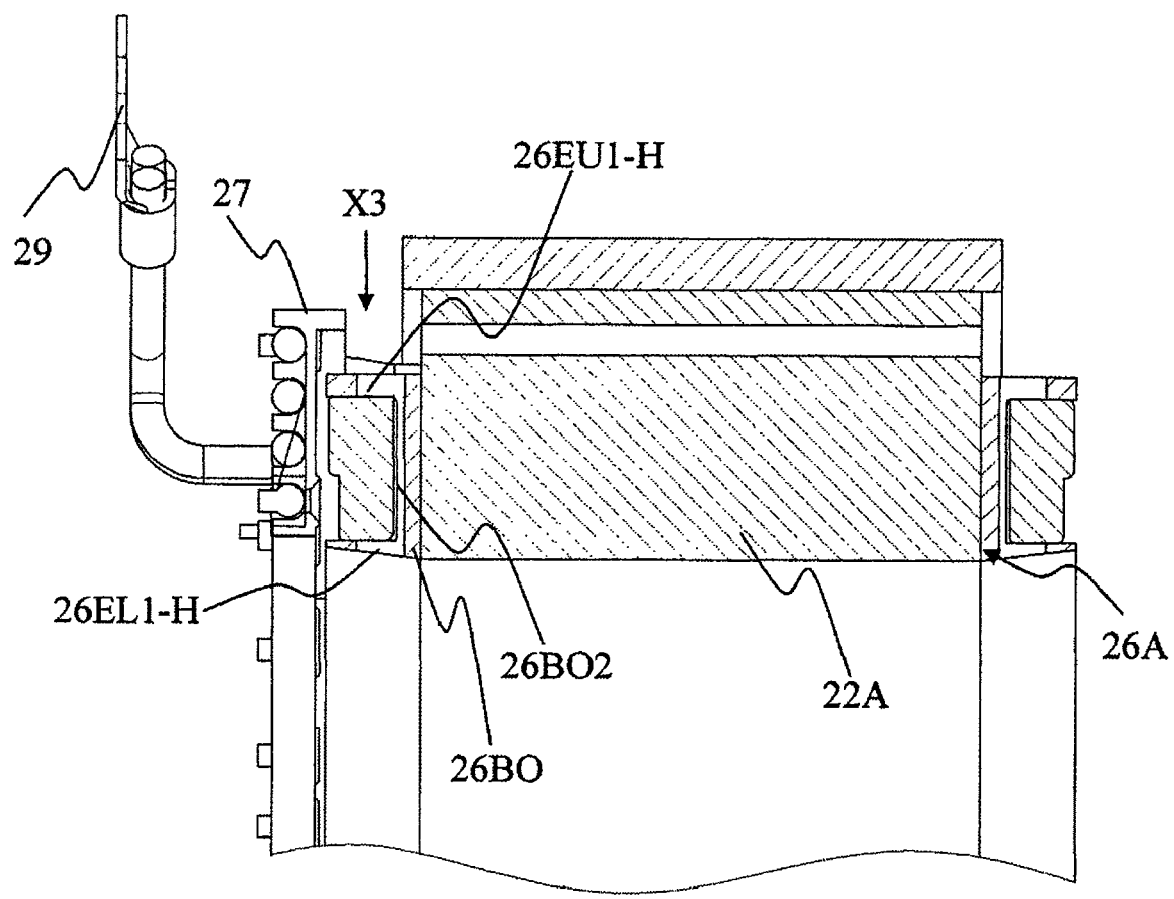
FIG. 9 is a cross-sectional view of the essential parts showing a cooling state for the inner peripheral side of a coil end section of a stator coil for the rotating electrical machine of the embodiment of the present invention.

Next, a description is given of cooling of the inner periphery side coil end of the stator coil for the rotating electrical machine of this embodiment using FIG. 9.

FIG. 9 is a cross-sectional view of the essential parts showing a cooling state for the inner peripheral side of a coil end of a stator coil for the rotating electrical machine of the embodiment of the present invention. In FIG. 9, numerals that are the same as for FIGS. 1 to 8 indicate the same portions.

The groove 26BO2 is formed on a coil end side of the bobbin body 26BO as shown in FIG. 8. A gap is then formed between the inner periphery of the coil end and the bobbin body 26BO by the groove 26BO2 when the stator coil 24A is wound at the bobbin body 26BO.

It is possible for coolant that flows in from the hole 26EU1-H of the flange section 26EU1 to pass through the gap formed by the groove 26BO2 and flow out from the hole 26EL1-H of the flange section 26EL1. It is therefore also possible for the inner periphery side coil end to be cooled by the coolant.

As described in FIG. 5, coolant sprayed to an outer diameter side of the stator 20 in the direction of the arrow X1 flows in the direction of the arrow X3, i.e., flows through the coil end and flows to within the stator 20.

In this embodiment, as described above, a path that the coolant RF flows through is formed using the gap 28 between the stator teeth core 22 and the distribution unit 27. The coolant RF can therefore be effectively concentrated around the coil end of the coil 24 of the stator 20 and the coil end can therefore be cooled from the outer diameter side.

It is also possible to increase the surface area for which the coolant RF makes contact with the coil end of the coil 24 by providing the hole 26EU-H at the flange section of the stator teeth core 22 positioned at the outer diameter side of the stator of the bobbin 26A and by providing the hole 26EL-H at the flange section on the inner diameter side of the stator of the bobbin 26A.

It is also possible to increase the surface area with which the coolant RF makes contact by providing the groove 26BO2 at the bobbin body 26BO so that the holes 26EU-H and 26EL-H communicate with each other enabling the coolant RF to make contact with the coil end of the coil 24 even at the inner periphery side of the coil end.

The cooling effect can therefore be increased because the contact surface area between the coil and the coolant is increased.

Figure 10:
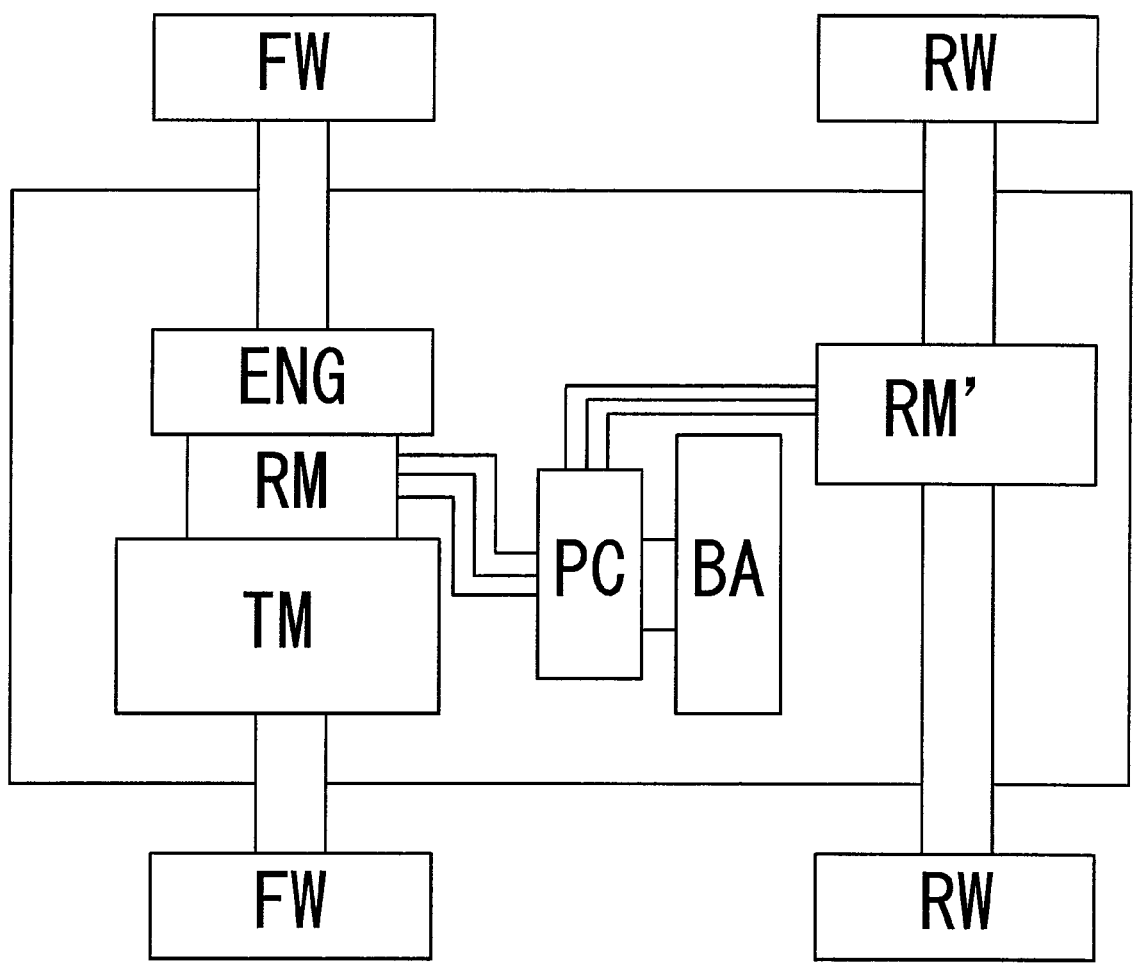
FIG. 10 is a block diagram showing a first configuration for a vehicle mounted with the rotating electrical machine of the embodiment of the present invention.
Figure 11:
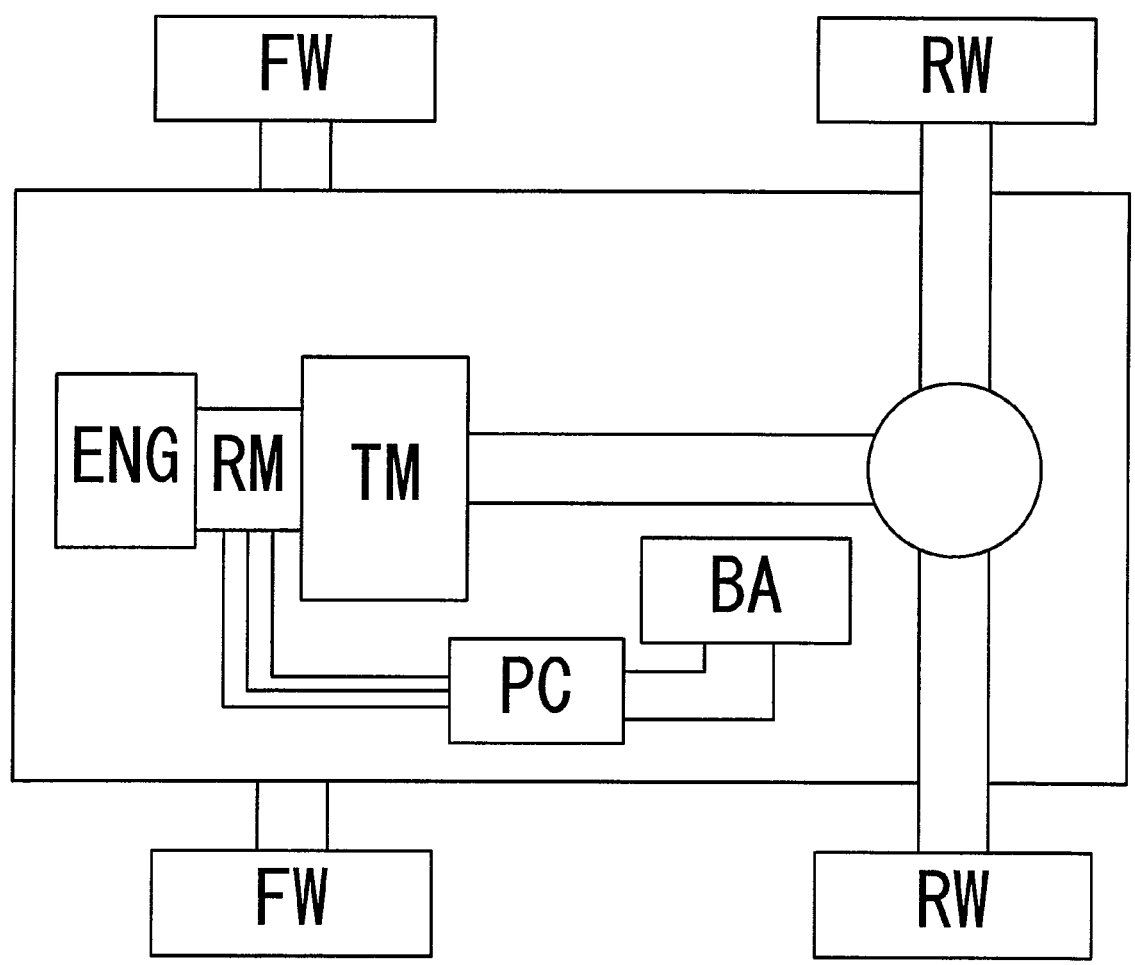
FIG. 11 is a block diagram showing a second configuration for a vehicle mounted with the rotating electrical machine of the embodiment of the present invention.

Next, a description is given of a configuration for a vehicle mounted with the rotating electrical machine of this embodiment using FIGS. 10 and 11. FIGS. 10 and 11 show a power train that assumes a hybrid vehicle. FIG. 10 is a block diagram showing a first configuration for a vehicle mounted with the rotating electrical machine of the embodiment of the present invention. FIG. 11 is a block diagram showing a second configuration for a vehicle mounted with the rotating electrical machine of the first embodiment of the present invention.

First, a description is given of a first configuration for a vehicle mounted with the rotating electrical machine of this embodiment using FIG. 10. FIG. 10 is a power train for a hybrid vehicle that assumes four-wheel driving.

The engine ENG and the rotating electrical machine RM are provided as the main power for the front wheels. Power generated by the engine ENG and the rotating electrical machine RM is subjected to speed change by the transmission TM before being transmitted to the front drive wheels FW. With regards to driving of the rear wheels, a rotating electrical machine RM' arranged at the rear wheel side and the rear drive wheels RW are mechanically connected so that power can be transmitted.

The rotating electrical machine RM starts the engine ENG and switches over between generating drive power, and generating electrical power by collecting energy during deceleration of the vehicle as electrical energy, according to the state of travel of the vehicle. The driving of the rotating electrical machine RM and the electricity generating operation are controlled by a power converter PC in line with the operating conditions of the vehicle so as to optimize torque and rotational speed. The power required to drive the rotating electrical machine RM is supplied by a battery BA via the power converter PC. When the rotating electrical machine RM is generating electricity, the battery BA is charged with electrical energy via the power converter PC.

The rotating electrical machine RM that is the drive source for the front wheels is provided between the engine ENG and the transmission TM and has the configuration described in FIGS. 1 to 9. It is also possible to use the same rotating electrical machine RM as the rotating electrical machine RM' that is the drive power source for the rear wheels or use a rotating electrical machine of another typical configuration.

In the configuration of FIG. 10, a front wheel drive hybrid vehicle is configured by omitting the rotating electrical machine RM' for driving the rear wheels so as not to drive the rear wheels.

FIG. 11 shows a power train for a hybrid vehicle that assumes rear-wheel driving.

The engine ENG and the rotating electrical machine RM are provided as the main power at a front wheels side. Power generated by the engine ENG and the rotating electrical machine RM is subjected to speed conversion using a transmission TM and power is transmitted to the rear drive wheels RW.

The rotating electrical machine RM starts the engine ENG and switches over between generating drive power, and generating electrical power by collecting energy during deceleration of the vehicle as electrical energy, according to the state of travel of the vehicle. The driving of the rotating electrical machine RM and the electricity generating operation are controlled by the power converter PC in line with the operating conditions of the vehicle so as to optimize torque and rotational speed. The power required to drive the rotating electrical machine RM is supplied by the battery BA via the power converter PC. When the rotating electrical machine RM is generating electricity, the battery BA is charged with electrical energy via the power converter PC.

The rotating electrical machine RM that is the drive source for the rear wheels is provided between the engine ENG and the transmission TM and has the configuration described in FIGS. 1 to 9.

A configuration for a four-wheel drive vehicle is also possible by adding a mechanism for transmitting power from an output unit of the transmission to the front wheels as with a typical vehicle.

Figure 12:
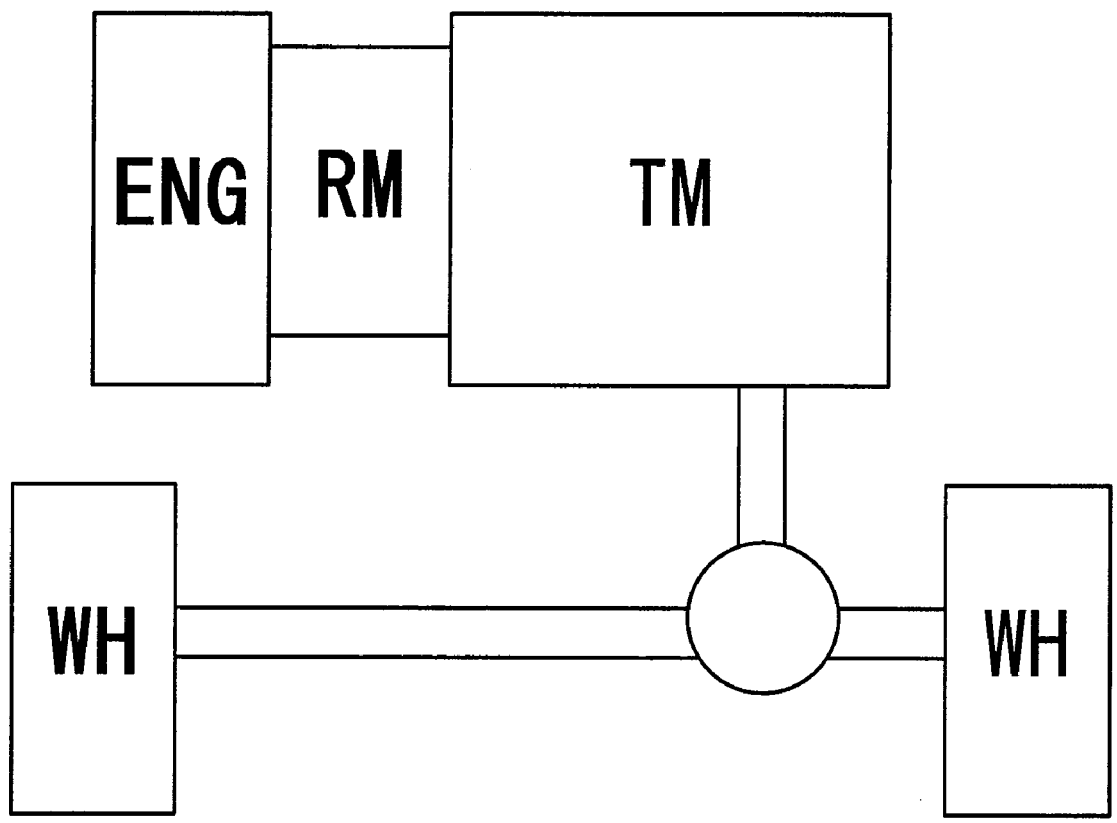
FIG. 12 is a block diagram showing a first example arrangement for an engine, rotating electrical machine, and transmission of a hybrid vehicle mounted with the rotating electrical machine of the embodiment of the present invention.
Figure 13:
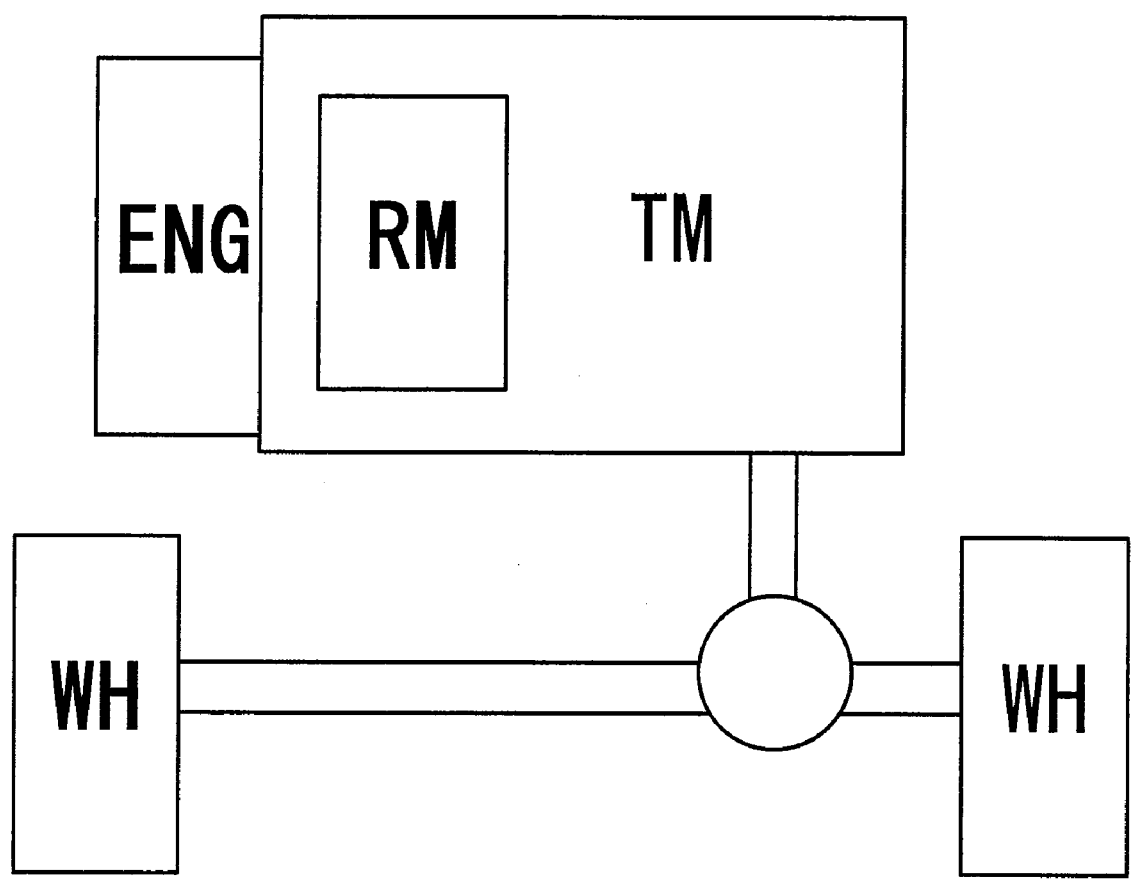
FIG. 13 is a block diagram showing a second example arrangement for an engine, rotating electrical machine, and transmission of a hybrid vehicle mounted with the rotating electrical machine of the embodiment of the present invention.

Next, a description is given of the arrangement of the engine ENG, the rotating electrical machine RM, and the transmission TM for a hybrid vehicle mounted with the rotating electrical machine of this embodiment using FIGS. 12 and 13.

FIG. 12 is a block diagram showing a first example arrangement for the engine ENG, rotating electrical machine RM, and transmission TM of a hybrid vehicle mounted with the rotating electrical machine of the embodiment of the present invention. FIG. 13 is a block diagram showing a second example arrangement for the engine ENG, the rotating electrical machine RM, and the transmission TM of a hybrid vehicle mounted with the rotating electrical machine of the embodiment of the present invention.

The manner in which the engine ENG, the rotating electrical machine RM, and the transmission TM of the hybrid vehicle are arranged can be classified into two main ways.

First, as shown in FIG. 12, it is possible to adopt a configuration where the engine ENG, the rotating electrical machine RM, and the transmission TM are provided independently. In this situation, the rotating electrical machine RM is mechanically connected between the engine ENG and the transmission TM. Output of the transmission TM is then transmitted to the drive wheels WH.

As shown in FIG. 13, it is also possible to provide just the engine ENG and the transmission TM independently. The engine ENG and the transmission TM are then connected together mechanically. The rotating electrical machine RM is mounted within the transmission TM. The transmission TM and the rotating electrical machine RM are then mechanically connected. The output of the transmission TM is transmitted to the drive wheels WH.

The rotating electrical machine RM that is the drive source for the drive wheels WH has the configuration described in FIGS. 1 to 9.

The rotating electrical machine of the above embodiment is capable of both improving cooling performance and maintaining insulation.

The above-described embodiments are examples, and various modifications can be made without departing from the scope of the invention.

What is claimed is:

1. A rotating electrical machine, comprising:
a stator that comprises a stator core and a teeth section, with a stator coil wound at the teeth section;
a rotor arranged via a clearance at an inner periphery side of the stator and supported in a freely rotating manner;
a distribution unit supported by a resin holder, and comprising a conductor connected to the stator coil, wherein:
the rotating electrical machine is cooled by coolant;
the stator coil comprises a coil end section projecting from an end of the stator in an axial direction;
a gap is formed between an end of the stator core and a lower surface of the distribution unit by mounting the distribution unit on an upper part of the coil end section, and
the gap constitutes a path for the coolant;
a bobbin, arranged between the teeth section and the stator core of the stator, that provides insulation between the teeth section and the stator coil and supports the stator coil; and
a hole, provided in at least one of a flange section on an outer diameter side of the bobbin and a flange section on an inner diameter side of the bobbin, that enables the coolant to make contact with an outer periphery of the stator coil;
wherein the bobbin is configured to prevent exposure of the stator coil to the stator core via the hole;
wherein the hole is provided at both the flange section on the outer diameter side of the bobbin and the flange section on the inner diameter side of the bobbin; and
wherein a groove, which has a bottom surface and is not a through hole, is provided at a position on a body of the bobbin facing an inner periphery side of the coil end section so as to enable the coolant to make contact with the inner periphery side of the coil end section of the stator coil.

* * * * *